US012428273B2

(12) United States Patent
Maurice et al.

(10) Patent No.: US 12,428,273 B2
(45) Date of Patent: Sep. 30, 2025

(54) DOUBLE PULLEY, RESCUE DEVICE COMPRISING SUCH DOUBLE PULLEY AND METHOD FOR USING SUCH RESCUE DEVICE

(71) Applicant: ZEDEL, Crolles (FR)

(72) Inventors: Alain Maurice, Saint Hilaire du Touvet (FR); Guillaume Bonnet, Montbonnot Saint Martin (FR); Marc Jourdan, St Martin d'Hères (FR)

(73) Assignee: ZEDEL, Crolles (FR)

(*) Notice: Subject to any disclaimer, the term of this patent is extended or adjusted under 35 U.S.C. 154(b) by 1035 days.

(21) Appl. No.: 17/492,298

(22) Filed: Oct. 1, 2021

(65) Prior Publication Data

US 2022/0106171 A1 Apr. 7, 2022

(30) Foreign Application Priority Data

Oct. 2, 2020 (FR) ....................................... 2010114

(51) Int. Cl.

*B66D 3/08* (2006.01)
*A63G 21/22* (2006.01)
*B66D 3/04* (2006.01)
*B66D 3/06* (2006.01)

(52) U.S. Cl.

CPC ............... *B66D 3/08* (2013.01); *A63G 21/22* (2013.01); *B66D 3/046* (2013.01); *B66D 3/06* (2013.01)

(58) Field of Classification Search

CPC . B66D 3/04; B66D 3/08; B66D 3/043; B66D 3/046; B66D 3/06; A63G 21/22; A63G 21/20; B61B 7/00; B61B 12/005

USPC ........... 104/112, 87, 89, 93, 113, 117, 173.1, 104/173.2; 105/149.1, 149.2, 148, 151

See application file for complete search history.

(56) References Cited

U.S. PATENT DOCUMENTS

| | | | | |
|---|---|---|---|---|
| 7,168,687 B2 * | 1/2007 | Thompson | A63B 29/02 254/415 |
| 7,966,941 B1 | 6/2011 | Brannan | |
| 9,707,976 B2 * | 7/2017 | Strasser | A63G 21/22 |
| 2006/0091369 A1 | 5/2006 | Thompson | |
| 2018/0216656 A1 * | 8/2018 | Bailey | B60C 27/10 |

FOREIGN PATENT DOCUMENTS

| | | | | |
|---|---|---|---|---|
| EP | 1036721 A1 * | 9/2000 | A63G 21/22 |
| EP | 3502037 A1 * | 6/2019 | A63G 21/22 |
| GB | 2522553 A * | 7/2015 | A63G 21/22 |

* cited by examiner

*Primary Examiner* — S. Joseph Morano
*Assistant Examiner* — Heaven R Buffington
(74) *Attorney, Agent, or Firm* — Oliff PLC

(57) ABSTRACT

A rescue device includes a pulley includes a support flange with two rotation shafts mounted salient and extending in a first direction. Two sheaves are mounted rotatable around two rotation shafts to define a running line of a cable. Two flanges are mounted rotatable between a first position and a second position. A first blocker is configured to present a first position blocking the first flange in the closed position and a second position allowing rotation of the first flange. A second blocker is configured to present a first position blocking the second flange in the closed position and a second position allowing rotation of the second flange. The second blocker is independent from the first blocker.

15 Claims, 4 Drawing Sheets

DOUBLE PULLEY, RESCUE DEVICE COMPRISING SUCH DOUBLE PULLEY AND METHOD FOR USING SUCH RESCUE DEVICE

BACKGROUND OF THE INVENTION

The invention relates to a double pulley.

PRIOR ART

For a large number of activities, it is important to have rescue equipment that is suitable for the wide variety of problems encountered. A requirement exists for suitable equipment when a victim present at the bottom of a ravine has to be rescued. It is then more practical to install a zip line connecting the two sides of the ravine and to lift the victim in substantially vertical manner to evacuate him/her along the zip line rather than attempting to perform the evacuation along an uneven and/or wooded rock face.

For the rescuers to be able to intervene safely, it is necessary to install several pulleys connected to one another. However, in a large number of operations, it is of paramount importance to be able to act quickly which means that suitable equipment has to be had and that it is necessary to know how to assemble the different equipment items so as to comply as best as possible with the constraints imposed by the configuration of the rescue operation.

A large number of pulleys are known but prove to be unsuitable or not very practical for rescue operations. The double pulley marketed under the trade name Tandem® Speed from the applicant or the Trac™ and Trac Plus™ pulleys can be cited which are not designed for rescue operations.

OBJECT OF THE INVENTION

One object of the invention consists in providing a double pulley that is easier to use in rescue operations and that improves safety.

This result tends to be achieved by means of a double pulley that comprises:

- a support flange,
- first and second rotation shafts fixed to the support flange and extending in a first direction from the support flange,
- first and second sheaves mounted rotatable respectively around the first and second rotation shafts, the first and second sheaves defining a running line along a cable perpendicular to the first direction,
- first and second flanges mounted rotatable respectively around the first and second rotation shafts, the first and second flanges being separated from the support flange by respectively the first and second sheaves, each of the first and second flanges being fitted rotatable between a first position and a second position independently from the other flange, the first position allowing the cable to be inserted on the first or second sheave, the second position preventing the cable from being extracted,
- a first blocking system configured to present a first position blocking the first flange in the first position, and to present a second position allowing movement of the first flange between the first position and the second position,
- a second blocking system configured to present a first position blocking the second flange in the first position, and to present a second position allowing movement of the second flange between the first position and the second position, the first blocking position and the second blocking position each presenting an operation independent from the other blocking system,
- a support hole designed to receive a connector connected to a person to be rescued.

In one development, the support flange has a first portion on which the first and second sheaves are fixed and a second portion defining the support hole located in a space between the sheaves underneath the running line. The first and second rotation shafts extend in the same direction from one surface of the support flange. The support flange defines a deviation in the first direction from the first portion to the second portion, in the same direction as the first and second rotation shafts.

In advantageous manner, the support flange has a first portion on which the first and second sheaves are fixed. The first portion defines a connection hole located between the first and second sheaves, the support flange extending in the first direction to form a lip above the running line.

In a particular configuration, the support flange has a first portion with first and second wings on which the first and second sheaves are fixed and a second portion defining the support hole located in a space between the sheaves underneath the running line. The first and second rotation shafts extend respectively in opposite first and second directions respectively from the opposite first and second surfaces of the first and second wings. The first portion defines a through groove in a first direction extending between the first and second sheaves up to the running line to enable the cable to be inserted between the first and second sheaves and to allow rotation of the support flange to align the longitudinal axis of the cable with the running line.

In one development, the first wing defines a first connection hole separated from the second portion by the first sheave and the second wing may define a second connection hole separated from the second portion by the second sheave.

Preferentially, the first blocking system and the second blocking system are both provided with a flexible member configured to bias the first blocking system and the second blocking system to the first position.

It is a further object of the invention to provide a rescue device that is easier to use than the prior art configurations and for example in a rescue operation to recover a person to be rescued at the bottom of a ravine.

The invention is remarkable in that it comprises a double pulley according to the foregoing configurations and in that it is also advantageous to provide for a first connector to be connected to a first wire member. The first connector is fixed to a first hole defined in the second portion of the support flange. The second portion defines a second hole, the first hole and the second hole being through holes in the first direction and being separated by a central space demarcated by two planes passing through the respective axes of rotation of the first and second sheaves perpendicular to the running line. A second connector is preferentially fixed in the second hole and fixed to a second wire member.

Preferentially, a third connector is connected to a third wire member by means of a pulley. The third connector is fixed to a third hole, the third wire member having one end connected to a person to be rescued possibly via a pulley. The first portion defines a fourth hole, the third and fourth hole being through holes in the first direction and being located in the central space, the third hole extending partially underneath the first sheave and the second hole extending partially underneath the second sheave. The bottom part of the third and fourth holes defines a support axis parallel to the running line. The rescue device may comprise a fourth connector fixed in the fourth hole and connected to a second pulley through which a second wire member passes, one end of which is connected to the person to be rescued.

In a first configuration, the support hole is defined in the second portion and passes through the support flange in the first direction. The support hole is formed between the third and fourth holes at equal distance from the first and second rotation shafts. The bottom part of the support hole is tangent to the support axis or above the support axis.

In a particular embodiment, a suspension pulley is fixed to a suspension connector fitted in the suspension hole, the suspension pulley being fitted pressing on an additional cable designed to be placed above said cable.

It is a further object of the invention to provide a method for using a rescue device that is easier to install on a rope or a cable than the prior art methods and in particular in rescue operations. The invention is remarkable in that it comprises the following steps:

- providing a rescue device according to the foregoing configuration and a cable,
- connecting the person to be rescued to the support hole,
- connecting the person to be rescued to the third hole by means of a wire member passing through the pulley fixed to the third connector,
- connecting a movement wire member to the first hole or to the second hole.

BRIEF DESCRIPTION OF THE DRAWINGS

Other advantages and features will become more clearly apparent from the following description of particular embodiments and implementation methods of the invention given for non-restrictive example purposes only and represented in the appended drawings, in which.

DESCRIPTION OF THE EMBODIMENTS

Figure 1:
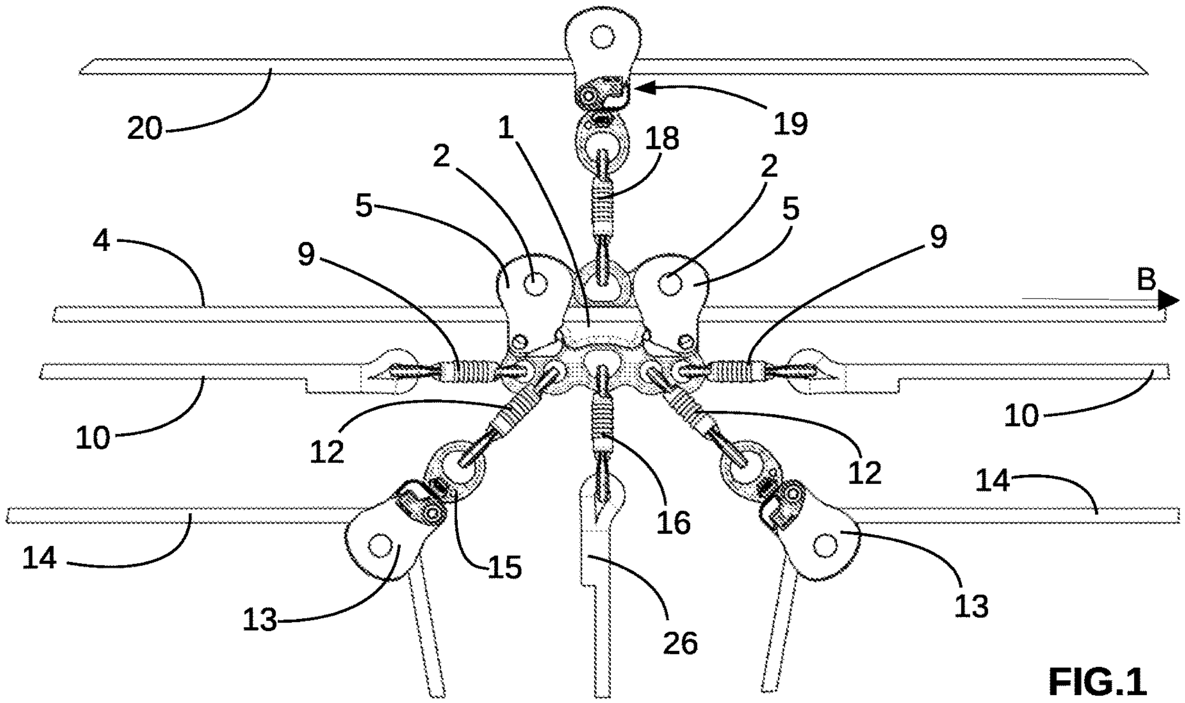
FIG. 1 illustrates a side view of a double pulley according to the invention fitted in a rescue device, in schematic manner.

FIG. 1 illustrates a rescue device that uses a double pulley to perform a rescue operation. The double pulley illustrated in FIGS. 1 to 6 has a support flange 1 that is preferentially made from metal, for example from steel or aluminium alloy. Support flange 1 ensures the strength of the double pulley. The rescue device comprises the double pulley associated with one or more connectors and with one or more cables or ropes.

The double pulley comprises first and second rotation shafts 2 fixed to support flange 1. First and second rotation shafts 2 extend in a first direction A from one of the surfaces of support flange 1. First and second rotation shafts 2 can be mounted fixedly on support flange 1 or in autorotation. In one embodiment, the two rotation shafts 2 extend in the same direction from support flange 1 in first direction A, preferentially extending from the same side. In another embodiment illustrated in FIGS. 7 and 8, the two rotation shafts 2 extend in two opposite directions.

The double pulley comprises first and second sheaves 3 fitted rotatable respectively around first and second rotation shafts 2. First and second sheaves 3 are designed to run along a cable 4 called support cable. They define a running line B along a cable perpendicular to first direction A. Running line B corresponds to the longitudinal axis of cable 4 once the double pulley has been installed. In preferential manner, sheaves 3 each define a groove designed to receive cable 4.

The double pulley comprises first and second flanges 5 fitted rotatable respectively around first and second rotation shafts 2. First and second flanges 5 are separated from support flange 1 respectively by first and second sheaves 3. Each of first and second flanges 5 is mounted rotatable between a first position and a second position. Each flange is fitted independently rotatable between a first position and a second position. The second position allows the cable to be inserted and extracted from the cavity designed to receive the cable for first sheave 3 or second sheave 3 to run on cable 4. The first position prevents insertion in and extraction from the cavity. The first and second flanges act as gates opening or closing the cavity designed to receive the cable. In the prior art configurations, the two sheaves 3 are mounted on a bracket formed by a metal sheet deformed into a U shape or by several parts assembled to form a U shape. The bracket is unremovable and defines a common insertion slot of cable 4 so that the latter can come into contact with the two sheaves 3.

Each of first and second flanges 5 serves the purpose in the device of keeping cable 4 inside the double pulley. The two flanges 5 are movable independently from one another between their first position and their second position.

The double pulley comprises a first blocking system 6 that collaborates with first flange 5 and a second blocking system 6 collaborating with second flange 5.

Once a double pulley has been installed, cable 4 is kept in position inside a first retaining ring and a second retaining ring. The first retaining ring is defined totally or partially by support flange 1, first sheave 3, first flange 5 and possibly first blocking system 6. The same is the case for the second retaining ring.

First blocking system 6 is configured to present a first position blocking first flange 5 in the first position and to present a second position allowing rotation of first flange 5 between the first position and the second position. When first blocking system 6 is in its first position and first flange 5 is in its first position, first flange 5 cannot leave the first position. When first blocking system 6 is in its first position and first flange 5 is in its second position, first flange 5 can move until it reaches the first position and it is then blocked in the first position. When first blocking system 6 is in its second position, first flange 5 can move freely between the first position and the second position.

Second blocking system 6 is configured to present a first position blocking second flange 5 in the first position and to present a second position allowing rotation of second flange 5 between the first position and the second position. When second blocking system 6 is in its first position and second flange 5 is in its first position, second flange 5 cannot leave the first position. When second blocking system 6 is in its first position and second flange 5 is in its second position, second flange 5 can move until it reaches the first position and it is then blocked in the first position. When second blocking system 6 is in its second position, second flange 5 can move freely between the first position and the second position. Operation of second blocking system 6 is independent from operation of first blocking system 6 and vice versa.

When first flange 5 is in the first position, the first retaining ring is closed preventing a cable 4 from being inserted in the first ring or preventing cable 4 from being extracted. When first flange 5 is in the second position, the first retaining ring is open allowing a cable 4 to be inserted or cable 4 to be extracted. When second flange 5 is in the first position, the second retaining ring is closed preventing a cable 4 from being inserted in the second retaining ring or preventing cable 4 from being removed. When second flange 5 is in the second position, the second retaining ring is open allowing a cable 4 to be inserted or cable 4 to be extracted.

The double pulley uses two sheaves 3 designed to run along cable 4 to procure maximum stability during the rescue operation. It has two retaining rings operating in independent manner thereby enhancing safety. The two retaining rings are kept in the closed state by two independent blocking systems 6. The two blocking systems 6 are configured to keep the two rings in the closed state independently from the presence or absence of the multiple connectors and from the state of the multiple connectors fixed to support flange 1. The two blocking systems are preferably mounted in fixed manner on the support flange.

It is advantageous for at least one blocking system 6 and preferentially both blocking systems 6 to be provided with a flexible member configured to bias the blocking system to its first position. The flexible member is configured to move the locking system to the first position if no load is applied on blocking system 6.

In this way, the user has to act on blocking system 6 to move the blocking system from its first position to the second position. Once the blocking system is in its second position, first flange 5 is move from the blocking position to the position allowing insertion or extraction of the cable. The first blocking system is biased to reach the position allowing rotation of the first flange and the first flange is then biased to open the cavity and extract or insert the cable. Once the cable has been inserted or extracted, the second blocking system is biased to reach the position allowing rotation of the first flange and the second flange is then biased to open the cavity and extract or insert the cable. To insert or extract the cable, it is necessary to successively perform an action on the first blocking system and the first flange and then on the second blocking system and the second flange. Inopportune extraction of the cable is more difficult. The flexible member can be formed by a torsion spring, a tension spring, a compression spring, a rod, a blade or any other elastically deformable member.

In the most common double pulleys, the reverse U-shaped bracket defines two flanges facing one another and each presenting a through hole situated under the level of the cable between the two sheaves. The two flanges extend continuously between the two rotation shafts. Once the cable has been installed, it is blocked in the pulley by means of the carabiner passing through the two through holes. The carabiner is connected to the user. In this particular case, removal of the carabiner to assist the person to be rescued results in neutralisation of the device securing the pulley on the cable. The same is substantially the case for double pulleys having an integrated carabiner as opening of the carabiner to assist the person results in access to the cable which may escape from the pulley. The configuration of such a pulley is not designed for rescue operations and does not on its own provide a sufficient safety level.

In order to be able to intervene in the multitude of different situations involved in a rescue operation, it is advantageous not to use connectors such as carabiners, shackles or quick links to performed fixing of cable 4 in the double pulley.

In order to facilitate use of the double pulley, it is particularly advantageous to provide for the centre of gravity of the double pulley to be located under running line B defined by the two sheaves fitted in line. What is meant by “located under” is that the centre of gravity of the double pulley is located in the half-space defined by the plane tangent to first sheave 3 and to second sheave 3, containing running line B and not containing rotation shafts 2. In this way, when the double pulley is fitted on cable 4 or when it is removed, the double pulley does not rock and does not have to be kept in place with one hand before closing the retaining rings. Once it has been fitted, the double pulley automatically places itself in the most suitable position for its use. Such a configuration is illustrated in FIGS. 1 to 8.

In an advantageous embodiment illustrated in FIGS. 1 to 8, support flange 1 has a first portion 1*a* on which first and second sheaves 3 are fixed and a second portion 1*b* defining a first through hole 7 located in a central space, and preferentially a space between the sheaves under running line B. The central space is bounded by two planes perpendicular to running line B and passing respectively through the two axes of rotation of the two sheaves 3. The two planes are noted under the reference D and are represented in broken lines in FIG. 2. The space between the sheaves is situated between the two sheaves 3 and is bounded by two planes respectively tangent to first sheave 3 and to second sheave 3 and perpendicular to running line B.

In a particular embodiment, support flange 1 defines a deviation in second portion 1*b* with respect to first portion 1*a* in first direction A in the same direction as first and second rotation shafts 2. The deviation can be seen in FIG. 6. In other words, support flange 1 is not flat. It is advantageous for the plane defined by second portion 1*b* to be offset from the plane defined by first portion 1*a* so as to come close to or to contain running line B. The plane defined by second portion 1*b* corresponds to the mid-plane of second portion 1*b* perpendicular to first direction A.

It is particularly advantageous for the mid-plane of second portion 1*b* to be the plane containing running line B. The mass of second portion 1*b* is in a position that incites the double pulley to keep rotation shafts 2 above the cable. It places the holes of second portion 1*b* lower than sheaves 3, when no load is applied, which makes it easy to use.

It is also preferable for first and second blocking systems 6 to be mounted salient from the first surface of support flange 1 in the extension of the deviation in first direction A. In this way, the mass connected to first and second blocking systems 6 partially or totally compensates the mass of first portion 1*a* of support flange 1 on the other side of the plane passing through running line B and perpendicular to first direction A. This configuration makes it possible to have a double pulley presenting a centre of gravity contained in the plane passing through running line B and perpendicular to first direction A or closer to this plane.

Second portion 1*b* defines a plurality of holes that are through holes in first direction A and in particular a support hole 7 that is a through hole in first direction A. Support hole 7 is arranged between first and second sheaves 3, in the central space. Support hole 7 is located under the running line, i.e. under cable 4. Support hole 7 is designed to support the person to be rescued, for example by means of a connector 16 associated with a wire member 26. Connector 16 is advantageously chosen from a carabiner, a quick link and a shackle.

It is particularly advantageous to provide for second portion 1*b* to define first and second holes 8 which are through holes in first direction A. First hole 8 and second hole 8 are defined in support flange 1 and are separated by the central space or a central area. Application of a weight in first or second hole 8 has the effect of making the double pulley rock which unloads one of the two sheaves 3. It is particularly advantageous to provide a rescue device wherein a first connector 9 and/or a second connector 9 are respectively fixed to first hole 8 and/or second hole 8. Connectors 9 are preferentially chosen from carabiners, shackles or quick links. First and second connectors 9 are respectively fixed to first and second wire members 10 which connect the double pulley to rescuers placed for example at one end of support cable 4 or at each end of support cable 4. The tensile stress on first wire member 10 or on second wire member 10 is directed in substantially parallel manner to the longitudinal direction of support cable 4 which avoids making the double pulley rock around one of sheaves 3. In a particular case, in a rescue operation, a single connector 9 and a single wire member 10 are used to pull on the double pulley in one direction only.

It is also advantageous to provide for second portion 1*b* of support flange 1 to define third and fourth holes 11. Third and fourth holes 11 are through holes in the first direction. Third and fourth holes 11 are formed between first and second holes 8 and advantageously in the central area. Third hole 11 extends partially or completely under first sheave 3 and fourth hole 11 extends partially or completely under second sheave 3 in a direction parallel to the first direction and to running line B. The bottom part of third and fourth holes 11 defines a support axis C that is parallel to running line B. It is possible to provide a support axis that is not parallel to running line B but this configuration is less advantageous.

This particularity enables the rescue device to be formed with a third connector 12 fitted in third hole 11 and/or a fourth connector 12 fitted in fourth hole 11. In preferential manner, a single pulley 13 is fitted in third connector 12 or in fourth connector 12 or a single pulley is fitted in each connector 12. A third wire member 14 passes through pulley 13 to connect the person to be rescued and rescuers placed for example at the end of support cable 4. The person to be rescued can be secured to a pulley that is not illustrated and wire member 14 passes through this pulley. The person to be rescued is lifted by a force exerted on the third wire member fixed to support flange 4 by means of third connector 12 and pulley 13. The force required to lift the person to be rescued is displaced to one end of support cable 4.

A part of the weight of the person to be rescued is applied on third hole 11 and/or fourth hole 11. The weight applied by the person to be rescued is located in the central area which tends to load the two sheaves 3. It is advantageous for single pulley 13 to have a rotary head 15 mounted rotating around an axis of rotation perpendicular to the axis of rotation of the sheave of single pulley 13.

It is particularly advantageous for support hole 7 to be located between third hole 11 and fourth hole 11 preferably at equal distance from first and second rotation shafts 2 and from the two sheaves 3. It is also advantageous for the bottom part of support hole 7 to be tangent to support axis C defined by third and fourth holes 11 or above support axis C.

It is advantageous for the rescue device to have a fifth connector 16 that is preferentially chosen from a carabiner, a quick link and a shackle. Fifth connector 16 is associated with a fifth wire member 26 that is fixed to the person to be rescued. A part of the weight of the person to be rescued is taken up by support hole 7 located in the central area which tends to load the two sheaves 3. When movement of the double pulley takes place during a rescue operation, the weight of the person to be rescued is taken up by the connection points situated in the central area so that the double pulley runs pressing on both its sheaves 3.

It is also advantageous to provide for first portion 1*a* to define a hole called connection hole 17 which is located between the two sheaves 3. Support flange 1 extends in first direction A to form a lip above running line B completely encircling connection hole 17. The lip protects cable 4 with respect to a suspension connector 18 fixed in the connection hole.

During a rescue operation, in preferential manner, a suspension pulley 19 is fixed to suspension connector 18 fitted in connection hole 17 situated between the two sheaves in first portion 1*a*. Suspension pulley 19 is fitted pressing on an additional cable 20 designed to be placed above support cable 4. Suspension pulley 19 preferentially has a single sheave and a rotary head. The suspension pulley can be identical to pulley 13 presented in the foregoing. The rotary head is fitted rotatable around an axis of rotation which is perpendicular to the axis of rotation of the sheave.

It is advantageous for suspension pulley 19 and/or for single pulley 13 to be lockable without the use of a connector.

Figure 2:
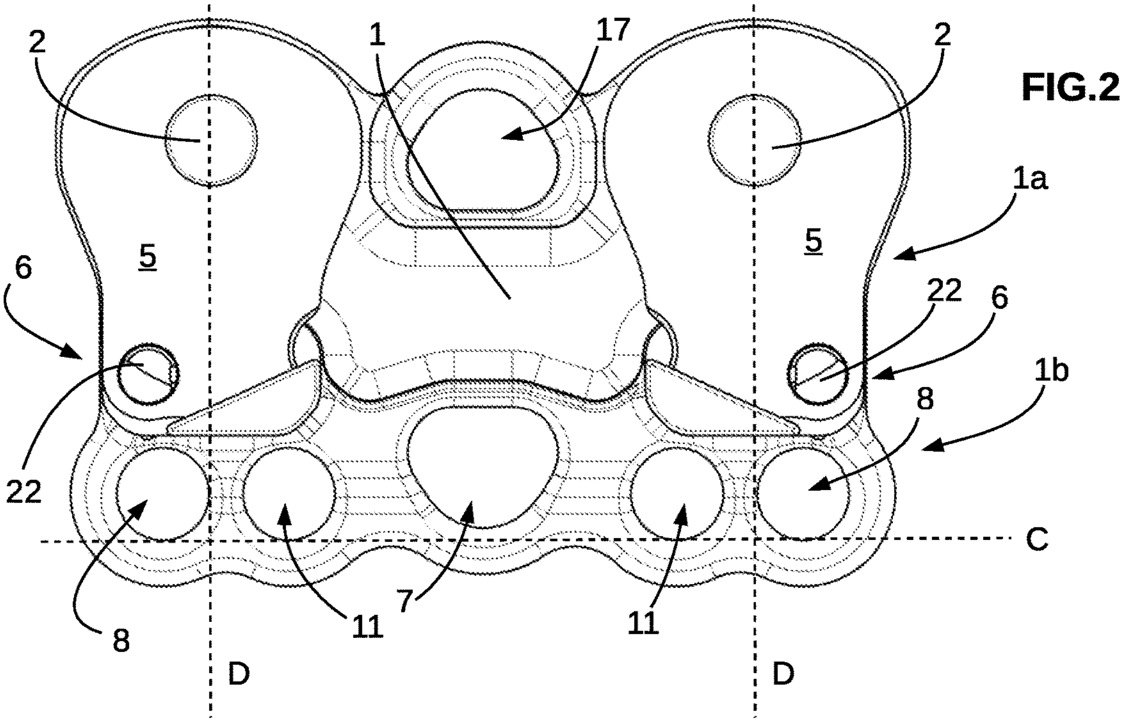
FIG. 2 illustrates a side view of a double pulley according to the invention with the movable flanges in the closed position, in schematic manner.
Figure 3:
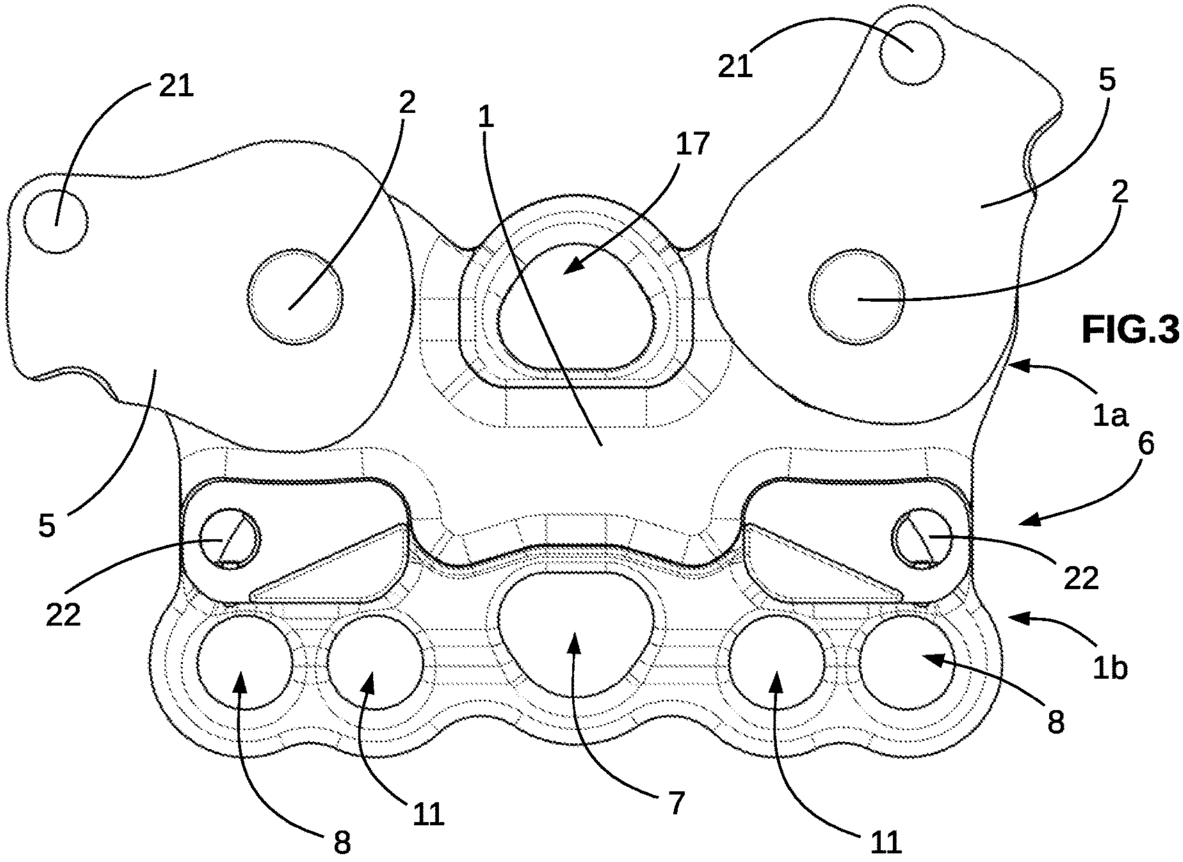
FIG. 3 illustrates a side view of a double pulley according to the invention with the movable flanges in the open position, in schematic manner.

As indicated in the foregoing, it is particularly advantageous for the two flanges 5 to be mounted lockable independently from one another and without the use of a connector which is used to be fixed to the person to be rescued or to another part of the assembly. This configuration enhances the practicability and safety of the double pulley. Blocking system 6 can be of any configuration. It is possible to use a flange 5 defining a through hole 21 in first direction A with blocking system 6 that has a finger 22 movable in a first direction and associated with a spring designed to bias the movable finger to be inserted in through hole 21 and to lock flange 5 in the position preventing extraction of cable 4. This embodiment is illustrated in FIGS. 1, 2 and 3. It is also advantageous for the two flanges 5 to pivot in two opposite directions to open the first retaining ring and the second retaining ring differently.

Figure 4:
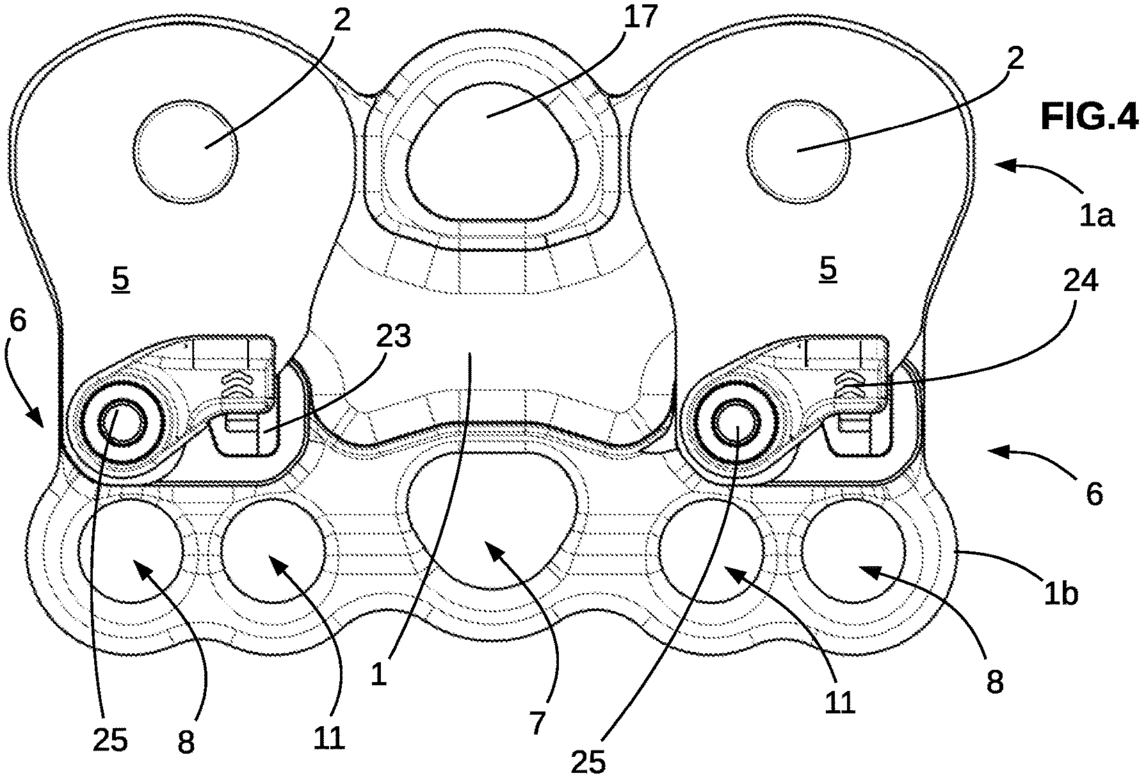
FIG. 4 illustrates a side view of a double pulley according to another embodiment of the invention with the movable flanges in the closed position, in schematic manner.
Figure 5:
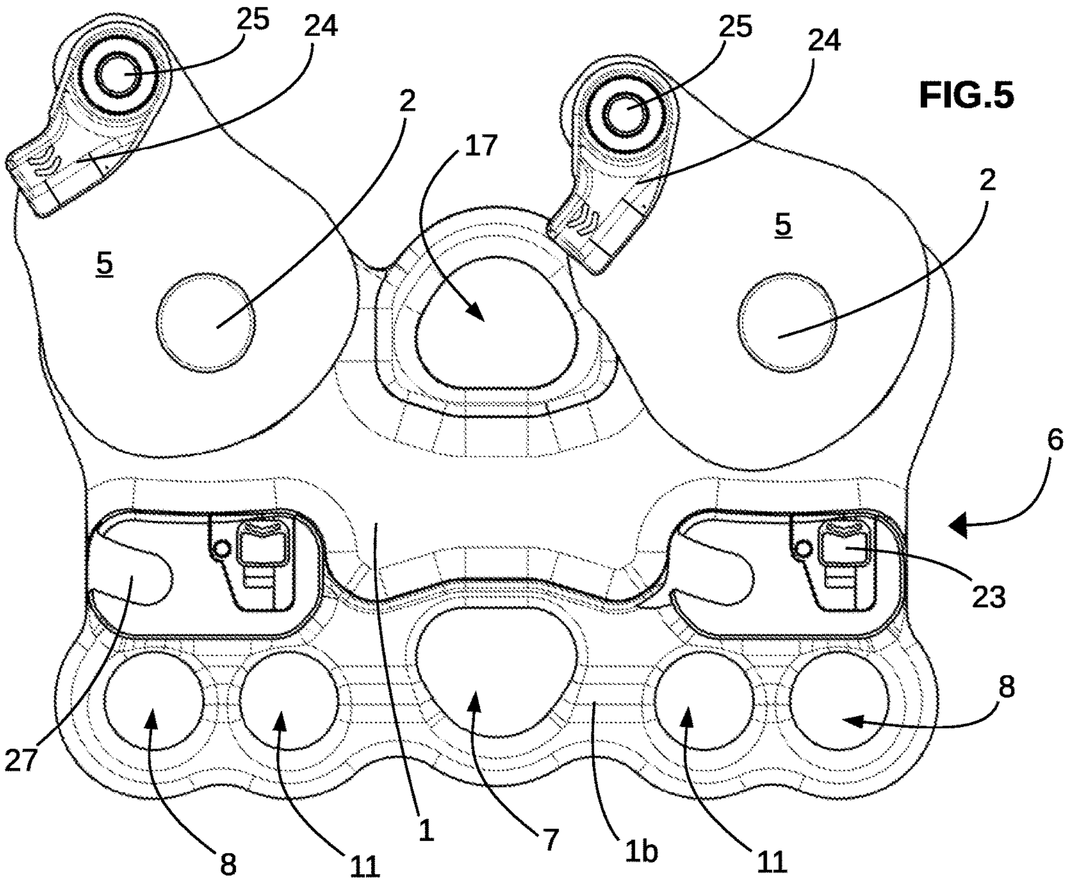
FIG. 5 illustrates a side view of a double pulley according to another embodiment of the invention with the movable flanges in the open position, in schematic manner.
Figure 6:
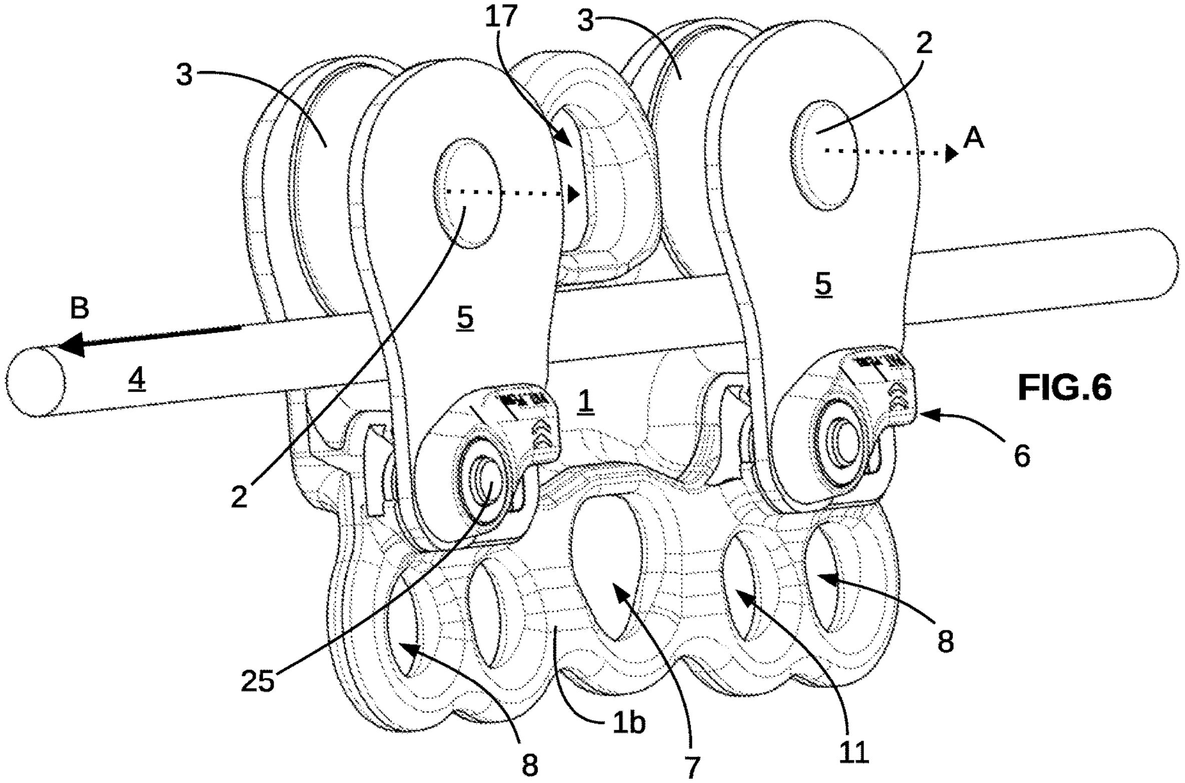
FIG. 6 illustrates a perspective view of a double pulley fitted on a support cable, in schematic manner.

In another configuration illustrated in FIGS. 4, 5 and 6, it is possible for the two flanges 5 to define a hook collaborating with a movable rod 23. When rod 23 is inserted in the hook, flange 5 is jammed in a position closing the retaining ring. When rod 23 has been moved to leave the hook, it is possible to rotate flange 5. Rod 23 is preferentially associated with a spring that biases rod 23 to the position performing locking of the hook. It is even more advantageous to provide for the flange to comprise a movable cover 24, for example a movable cover fitted movable in rotation around a rotation shaft 25 fixed on flange 5.

A spring (not illustrated) biases movable cover 24 to a position covering rod 23 when rod 23 is in its position blocking flange 5 and flange 5 is in the position closing the retaining ring. In this way, undesired loading of rod 23 is reduced. To provide even more safety, the movable cover 24 moves in a first direction to make rod 23 appear, and rod 23 has to be moved in a direction opposite from the first direction to come out of the hook and allow rotation of flange 5. It is advantageous for the locking system or the support flange to define a slide 27 and for a pin mounted salient from the associated flange 5 to be inserted in slide 27. This configuration enhances take-up of a part of the forces on rotation shaft 2.

It is also possible to provide for movable cover 24 to be fitted on flange 5 of FIGS. 1 to 3 so as to be able to access movable finger 21 to be pushed.

In general manner, it is particularly advantageous for each blocking system to provide a mechanical connection between the associated flange and the support flange to oppose sagging of the rotation shaft. In the embodiment of FIGS. 1, 2 and 3, the movable finger is configured to prevent flange 5 from moving towards second portion **1*b* by sagging of the rotation shaft. The movable finger takes up a part of the forces applied on the finger. In the embodiment of FIGS. 4, 5 and 6, the same is advantageously the case for slide 27** cooperating with the pin. It is even more advantageous for opening of at least one flange or of each flange to be impossible when the double pulley is under load, for example when it is supporting a person weighing at least 40 kilogrammes.

During a rescue operation with a person stuck on cable 4 or in a ravine, it is first of all necessary to get to a rescuer in place in the immediate proximity of the person to be rescued or vertically above him. The rescuer moves along cable 4 or on the additional cable 20 with its pulley. Once he is close to the person to be rescued or vertically above him, the rescue double pulley has to be able to be installed in the best possible conditions. A conventional double pulley is not very practical as the slot for inserting and extracting cable 4 is only locked after the carabiner has been installed and the carabiner is only fitted after it has been fixed to the person to be rescued to avoid loading the latter with the finger open.

It is therefore advantageous to have a double pulley having two flanges 5 that are lockable independently from the presence or absence of connectors fitted on the double pulley. Once he has reached his destination, the rescuer installs the double pulley and locks the two flanges 5 so as to have a double pulley ready to be connected to the person to be rescued and pressing safely on support cable 4.

Once the double pulley has been installed, the rescuer can connect support hole 7 to the person to be rescued so as to be able to move the person along cable 4. A first wire member 10 connected on the one hand to the rescuer and on the other hand to at least another rescuer is moved to be connected to first hole 8. In this way, the rescuer or rescuers in place at the end of support cable 4 are able to pull on the double pulley to facilitate movement of the person to be rescued in comparison with the rescuer in place on support cable 4.

It is also advantageous to connect the person to be rescued to the rescuer or to the group of rescuers who are in place at the end of support cable 4 by means of a single pulley 13 fixed in third hole 11. The double pulley can also be used in other rescue configurations.

Figure 7:
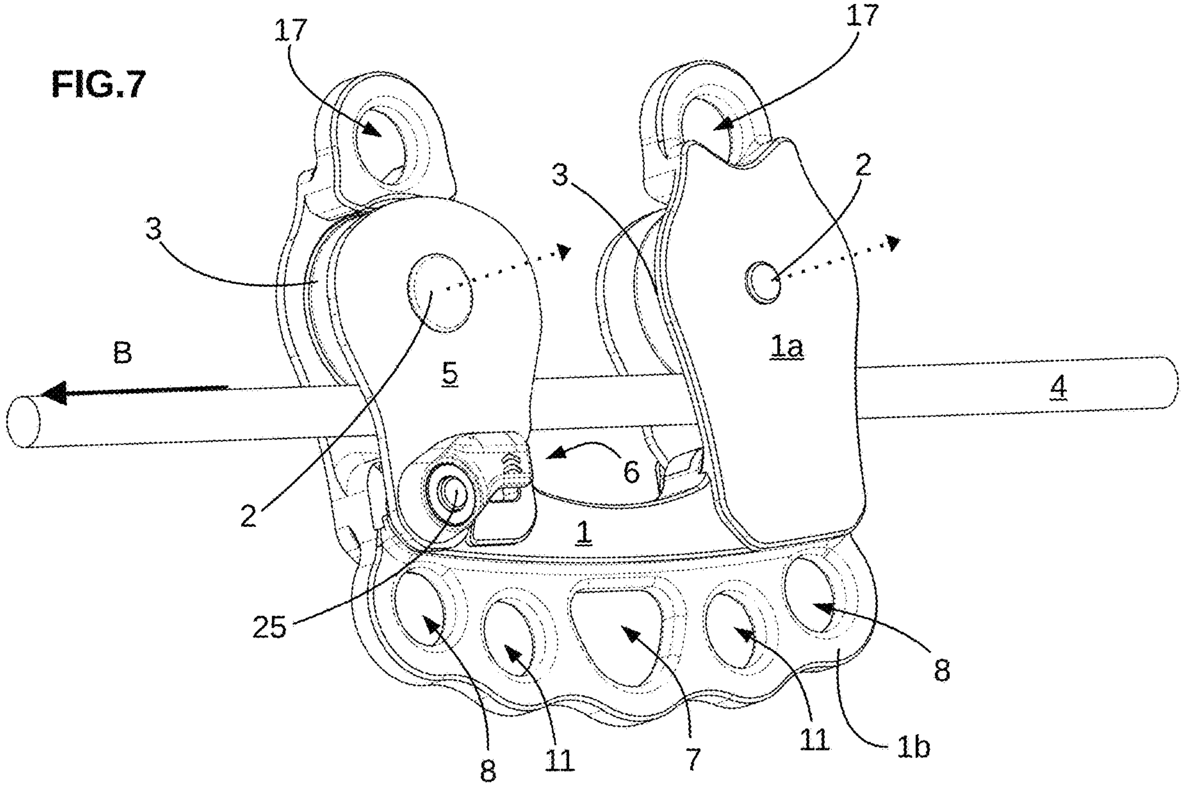
FIG. 7 illustrates a perspective view of another configuration of a double pulley fitted on a support cable, in schematic manner.
Figure 8:
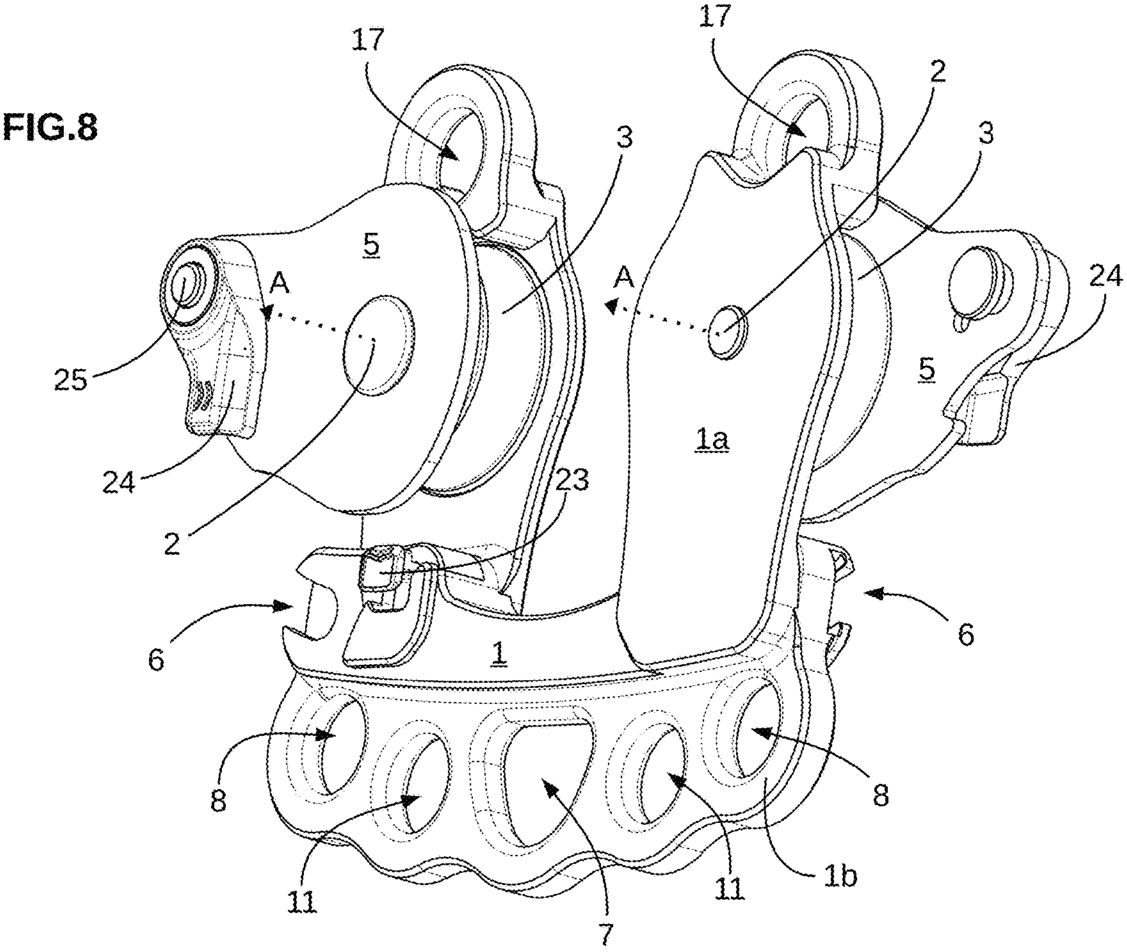
FIG. 8 illustrates a perspective view of another configuration of a double pulley fitted on a support cable with the movable flanges in the open position, in schematic manner.

FIGS. 7 and 8 illustrate yet another configuration of a double pulley where first sheave 3 is associated with first additional flange 5 and with its first blocking system 6. Second flange 5 is associated with a second additional flange 5 and with its second blocking system 6.

The two rotation shafts 2 extend in two opposite directions respectively from the opposite first and second wings of support flange 1. In this configuration, support flange 1 is no longer flat. Support flange 1 presents first and second wings in first portion **1*a* that are separated by running line B. First and second sheaves 3 are fixed respectively to the first and second wings. The two wings are separated by an empty area so as to enable cable 4 to be inserted between the two sheaves 3 with a cable the longitudinal axis of which is parallel to first direction A. The empty area is in the form of a groove that is pass-through in first direction A. The groove extends up to running line B enabling cable 4 to be inserted in the groove between the two sheaves 3, and support flange 1 to then be rotated to align the longitudinal axis of the cable with running line B. Once the cable has been inserted between the two wings under the axis connecting the two sheaves, the double pulley is rotated so that each sheave presses on cable 4**. This configuration is particularly advantageous as the double pulley is symmetrical with an axis of symmetry that corresponds to the axis of rotation of the support flange to align the longitudinal axis of the cable and of the running line. The axis of rotation is perpendicular to first direction A and to running line B. The axial symmetry can be present or not for the two fixing means.

In preferential manner, at least one of the wings defines a connection hole 17 that is a through hole in first direction A. The connection hole is separated from second portion **1*b* by the associated sheave. In even more preferential manner, each wing defines a connection hole 17 that is a through hole in first direction A. Each connection hole 17 is separated from second portion 1*b* by the associated sheave. Advantageously, the connection hole or holes 17 are formed in rings that belong to the same plane as the running line and as the rings defining holes 7, 8 and 11**. In this way, the forces are in one and the same plane.

It is particularly advantageous for the two flanges 5 to move from their closed position to their open position by rotating in two opposite directions and preferentially to move away from the groove present between the two wings.

In the embodiment illustrated in FIGS. 7 and 8, the locking means is identical to that illustrated in FIGS. 4, 5 and 6, but it is possible for the locking means to be that illustrated in FIGS. 1 to 3.

In the embodiment illustrated in FIGS. 7 and 8, the plane defined by the first wing of support flange 1 is coplanar with the plane defined by second flange 5 whereas the plane defined by the second wing of support flange 1 is coplanar with the plane defined by first flange 5.

The rescue device described in the foregoing makes for easier use in particular with the following steps:

- providing a rescue device according to one of the foregoing configurations and a cable 4,
- fitting first sheave 3 and possibly second sheave 3 on cable 4, i.e. at the same time or not,
- connecting the person to be rescued to support hole 7,
- connecting the person to be rescued to third hole 11 by means of a wire member 14 passing through the pulley 13 fixed to third connector 12,
- connecting a movement wire member 10 to first hole 8 or to second hole 8.

The invention claimed is:

1. A double pulley comprising:

a support flange;

a first rotation shaft and a second rotation shaft that are each mounted fixed to the support flange and extending in a first direction;

first and second sheaves mounted rotatable respectively around the first and second rotation shafts, the first and second sheaves defining a running line perpendicular to the first direction, the running line being designed to receive a cable;

a first flange mounted rotatable with respect to the support flange and mounted rotatable around the first rotation shaft between a first position and a second position, the first flange being separated from the support flange by the first sheave, and wherein at least the first flange, the first rotation shaft and the support flange define a first retaining ring designed to receive the cable, the second position of the first flange allowing the cable to be inserted on the first sheave, the first position of the first flange preventing the cable from being extracted from the first retaining ring;

a second flange mounted rotatable with respect to the support flange and mounted rotatable around the second rotation shaft between a first position and a second position, the second flange being separated from the support flange by the second sheave, at least the second flange, the second rotation shaft and the support flange defining a second retaining ring designed to receive the cable, the second position of the second flange allowing the cable to be inserted on the second sheave, the first position of the second flange preventing the cable from being extracted from the second retaining ring, the first flange being mounted rotatable between the first position and the second position independently from the second flange;

a first blocking system configured to present a first position blocking the first flange in the first position and to present a second position allowing movement of the first flange between the first position of the first flange and the second position of the first flange;

a second blocking system configured to present a first position blocking the second flange in the first position and to present a second position allowing movement of the second flange between the first position of the second flange and the second position of the second flange, the first blocking system having an operation independent from the second blocking system;

a support hole defined in the support flange below the running line, the support hole being arranged in a central space demarcated by a first plane and a second plane each perpendicular to the running line, the first plane passing through a first axis of rotation of the first sheave and the second plane passing through a second axis of rotation of the second sheave, the support hole being a through hole in the first direction designed to receive a connector designed to be connected to a person to be rescued; and a connection hole defined in the support flange above the running line, the connection hole being arranged in the central space, the connection hole being a through hole in the first direction;

wherein the support flange defines a bottom part of the connection hole, the bottom part of the connection hole extending in the first direction to form a lip above the running line in a plane perpendicular to the first direction and passing through the first and second sheaves.

2. The double pulley according to claim 1 wherein the support wall defines a top part of the support hole, the top part of the support hole extending in the first direction to form a lip under the running line in the plane perpendicular to the first direction and passing through the first and second sheaves.

3. A rescue device comprising the double pulley according to claim 1 wherein a first connector is connected to a movement wire member directed to apply a tensile stress in a substantially parallel manner to running line, the first connector being fixed to a first hole defined in the support flange below the running line and wherein the support flange defines a second hole below the running line, the first hole and second hole being through holes in the first direction and being separated by the central space.

4. The rescue device according to claim 3 wherein a third connector is connected to a first wire member by means of a third pulley, the third connector being fixed to a third hole, the first wire member having one end connected to a person to be rescued, wherein the support flange defines a fourth hole, the third and fourth holes being through holes in the first direction and being arranged in the central space below the running line, the third hole extending partially under the first sheave and the fourth hole extending partially under the second sheave, and wherein a bottom part of the third and fourth holes defines a support axis parallel to the running line.

5. The rescue device according to claim 4 wherein the support hole is formed between the third and fourth holes at equal distance from the first and second rotation shafts, and wherein the bottom part of the support hole is tangent to the support axis or above the support axis.

6. A method for using a rescue device according to the following steps:

providing the rescue device according to claim 5 and the cable, connecting the person to be rescued to the support hole, connecting the person to be rescued to the third hole by means of the first wire member passing through the third pulley fixed to the third connector, and connecting the movement wire member to the first hole.

7. The rescue device comprising a double pulley according to claim 4 comprising a fourth connector fixed in the fourth hole and connected to a second pulley through which a second wire member passes, one end of the second wire member is connected to the person to be rescued.

8. The rescue device comprising a double pulley according to claim 3 comprising a second connector fixed in the second hole and fixed to a second movement wire member.

9. A double pulley comprising:

a support flange having a first portion with a first wing and a second wing;

a first rotation shaft mounted fixed to the first wing and extending in a first direction, a second rotation shaft mounted fixed to the second wing and extending in a second direction opposite the first direction, the first rotation shaft extending from a first face of the first wing, the second rotation shaft extending from a second face of the second wing;

first and second sheaves mounted rotatable respectively around the first and second rotation shafts, the first and second sheaves defining a running line perpendicular to the first direction, the running line being designed to receive a cable;

a first flange mounted rotatable with respect to the support flange and mounted rotatable around the first rotation shaft between a first position and a second position, the first flange being separated from the support flange by the first sheave, and wherein at least the first flange, the first rotation shaft and the support flange define a first retaining ring designed to receive the cable, the second position of the first flange allowing the cable to be inserted on the first sheave, the first position of the first flange preventing the cable from being extracted from the first retaining ring;

a second flange mounted rotatable with respect to the support flange and mounted rotatable around the second rotation shaft between a first position and a second position, the second flange being separated from the support flange by the second sheave, at least the second flange, the second rotation shaft and the support flange defining a second retaining ring designed to receive the cable, the second position of the second flange allowing the cable to be inserted on the second sheave, the first position of the second flange preventing the cable from being extracted from the second retaining ring, the first flange being mounted rotatable between the first position and the second position independently from the second flange;

a first blocking system configured to present a first position blocking the first flange in the first position and to present a second position allowing movement of the first flange between the first position of the first flange and the second position of the first flange;

a second blocking system configured to present a first position blocking the second flange in the first position and to present a second position allowing movement of the second flange between the first position of the second flange and the second position of the second flange, the first blocking system having an operation independent from the second blocking system; and a support hole designed to receive a connector designed to be connected to a person to be rescued, the support hole being defined in a second portion of the support flange, the support hole being arranged below the running line in a central space demarcated by a first plane and a second plane each perpendicular to the running line, the first plane passing through a first axis of rotation of the first sheave and the second plane passing through a second axis of rotation of the second sheave, the first portion defines a through groove in the first direction extending between the first and second sheaves up to the running line.

10. The double pulley according to claim 9 wherein the first wing defines a first connection hole separated from the second portion by the first sheave.

11. The double pulley according to claim 10 wherein the second wing defines a second connection hole separated from the second portion by the second sheave.

12. A double pulley comprising:

a support flange;

a first rotation shaft and a second rotation shaft each mounted fixed to the support flange and extending in a first direction;

first and second sheaves mounted rotatable respectively around the first and second rotation shafts, the first and second sheaves defining a running line perpendicular to the first direction, the running line being designed to receive a cable;

a first flange mounted rotatable with respect to the support flange and mounted rotatable around the first rotation shaft between a first position and a second position, the first flange being separated from the support flange by the first sheave, and wherein at least the first flange, the first rotation shaft and the support flange define a first retaining ring designed to receive the cable, the second position of the first flange allowing the cable to be inserted on the first sheave, the first position of the first flange preventing the cable from being extracted from the first retaining ring;

a second flange mounted rotatable with respect to the support flange and mounted rotatable around the second rotation shaft between a first position and a second position, the second flange being separated from the support flange by the second sheave, at least the second flange, the second rotation shaft and the support flange defining a second retaining ring designed to receive the cable, the second position of the second flange allowing the cable to be inserted on the second sheave, the first position of the second flange preventing the cable from being extracted from the second retaining ring, the first flange being mounted rotatable between the first position and the second position independently from the second flange;

a first blocking system configured to present a first position blocking the first flange in the first position and to present a second position allowing movement of the first flange between the first position of the first flange and the second position of the first flange;

a second blocking system configured to present a first position blocking the second flange in the first position and to present a second position allowing movement of the second flange between the first position of the second flange and the second position of the second flange, the first blocking system having an operation independent from the second blocking system;

a support hole defined in the support flange below the running line, the support hole being disposed in a central space demarcated by a first plane and a second plane each perpendicular to the running line, the first plane passing through a first axis of rotation of the first sheave and the second plane passing through a second axis of rotation of the second sheave, the support hole being designed to receive a connector designed to be connected to a person to be rescued; and a connection hole defined in the support flange above the running line, the connection hole being arranged in the central space, the connection hole being a through hole in the first direction;

wherein the first blocking system and the second blocking system are disposed below a plane passing through the running line and parallel to the first direction and are separated by the support hole.

13. The double pulley according to claim 12 wherein the first blocking system and the second blocking system each comprise a movable cover fixed to the first flange or the second flange.

14. A double pulley comprising:

a support flange;

a first rotation shaft and a second rotation shaft each mounted fixed to the support flange and extending in a first direction;

first and second sheaves mounted rotatable respectively around the first and second rotation shafts, the first and second sheaves defining a running line perpendicular to the first direction, the running line being designed to receive a cable;

a first flange mounted rotatable with respect to the support flange and mounted rotatable around the first rotation shaft between a first position and a second position, the first flange being separated from the support flange by the first sheave, and wherein at least the first flange, the first rotation shaft and the support flange define a first retaining ring designed to receive the cable, the second position of the first flange allowing the cable to be inserted on the first sheave, the first position of the first flange preventing the cable from being extracted from the first retaining ring;

a second flange mounted rotatable with respect to the support flange and mounted rotatable around the second rotation shaft between a first position and a second position, the second flange being separated from the support flange by the second sheave, at least the second flange, the second rotation shaft and the support flange defining a second retaining ring designed to receive the cable, the second position of the second flange allowing the cable to be inserted on the second sheave, the first position of the second flange preventing the cable from being extracted from the second retaining ring, the first flange being mounted rotatable between the first position and the second position independently from the second flange;

a first blocking system configured to present a first position blocking the first flange in the first position and to present a second position allowing movement of the first flange between the first position of the first flange and the second position of the first flange;

a second blocking system configured to present a first position blocking the second flange in the first position and to present a second position allowing movement of the second flange between the first position of the second flange and the second position of the second flange, the first blocking system having an operation independent from the second blocking system; and a support hole and a connection hole defined in the support flange, the support hole and the connection hole being separated by the running line, a centre of the support hole and a centre of the connection hole are aligned along a line perpendicular to the running line, the support hole and the connection hole being disposed in a central space demarcated by a first plane and a second plane each perpendicular to the running line, the first plane passing through a first axis of rotation of the first sheave and the second plane passing through a second axis of rotation of the second sheave, wherein the first rotation shaft and the second rotation shaft are mounted fixed to a first face of the support flange and, between the support hole and the connection hole, the first face is visible between the first flange and the second flange in an observation direction parallel to the first direction.

15. The double pulley according to claim 14, comprising: first and second holes defined in the support flange below the running line, the first hole and the second hole being through holes in the first direction and being separated by the central space.

* * * * *